(12) United States Patent
Möller et al.

(10) Patent No.: US 10,174,714 B2
(45) Date of Patent: Jan. 8, 2019

(54) APPARATUS AND METHOD FOR COMBINED ELECTRICAL AND MECHANICAL UTILIZATION OF THE ENERGY OF AN EXPANSION MACHINE

(71) Applicant: MAN TRUCK & BUS AG, München (DE)

(72) Inventors: Heribert Möller, Sachsen bei Ansbach (DE); Gottfried Raab, Perg (AT); Josef Klammer, Steyr (AT); Götz Freiherr Von Esebeck, Blankenfelde-Mahlow (DE); Stefan Robausch, St. Ulrich bei Steyr (AT)

(73) Assignee: MAN Truck & Bus AG, Munich (DE)

( * ) Notice: Subject to any disclaimer, the term of this patent is extended or adjusted under 35 U.S.C. 154(b) by 98 days.

(21) Appl. No.: 15/217,568

(22) Filed: Jul. 22, 2016

(65) Prior Publication Data
US 2017/0022933 A1 Jan. 26, 2017

(30) Foreign Application Priority Data
Jul. 25, 2015 (DE) ........................ 10 2015 009 636

(51) Int. Cl.
| | |
|---|---|
| *F02G 5/02* | (2006.01) |
| *B60K 6/485* | (2007.10) |
| *F01D 15/10* | (2006.01) |
| *B60W 20/00* | (2016.01) |
| *B60L 1/00* | (2006.01) |
| *B60W 20/40* | (2016.01) |

(52) U.S. Cl.
CPC ............... *F02G 5/02* (2013.01); *B60K 6/485* (2013.01); *B60L 1/00* (2013.01); *B60W 20/00* (2013.01);
(Continued)

(58) Field of Classification Search
CPC ......... F02G 5/02; B60W 20/40; B60W 20/00; B60L 1/00; B60K 6/485; F01D 15/10;
(Continued)

(56) References Cited

U.S. PATENT DOCUMENTS 7,475,541 B2 * 1/2009 Ibaraki .................. F01K 23/065
60/618
8,726,661 B2 * 5/2014 Spicer ..................... F02G 1/043
60/299

(Continued)

FOREIGN PATENT DOCUMENTS

| DE | 10 2005 058 198 | 6/2007 |
| DE | 10 2007 026 264 | 12/2008 |

(Continued)

OTHER PUBLICATIONS

Search Report dated Nov. 22, 2016 which issued in the corresponding European Patent Application No. 16001428.8.

*Primary Examiner* — Hoang Nguyen
(74) *Attorney, Agent, or Firm* — Cozen O'Connor (57) ABSTRACT

An apparatus V and a method, preferably for a motor vehicle, in particular a commercial vehicle. The apparatus V includes an internal combustion engine, an expansion machine and a generator. The expansion machine and the generator can be operatively connected both to one another and in each case to the internal combustion engine via a transmission, in order to make selective electrical utilization and mechanical utilization of the energy of the expansion machine possible.

19 Claims, 4 Drawing Sheets

(52) U.S. Cl.
CPC ............. *B60W 20/40* (2013.01); *F01D 15/10* (2013.01); *B60Y 2400/206* (2013.01); *Y02T 10/166* (2013.01); *Y02T 10/6226* (2013.01); *Y10S 903/903* (2013.01)

(58) Field of Classification Search
CPC ............... Y02T 10/166; Y10S 903/903; B60Y 2400/206
USPC .......................................... 60/614, 616, 618
See application file for complete search history.

(56) References Cited

U.S. PATENT DOCUMENTS

| | | | | |
|---|---|---|---|---|
| 2010/0155157 | A1* | 6/2010 | Grieve | B60K 6/12 180/65.6 |
| 2013/0139515 | A1* | 6/2013 | Schlak | F02C 3/00 60/772 |
| 2013/0174544 | A1* | 7/2013 | Valetutti | F02G 5/02 60/598 |
| 2014/0150426 | A1 | 6/2014 | Rewers et al. | |
| 2014/0373676 | A1* | 12/2014 | Nefcy | B60W 20/00 74/7 C |
| 2015/0075163 | A1 | 3/2015 | Frank et al. | |
| 2016/0201519 | A1* | 7/2016 | Zhou | F01K 23/101 60/618 |

FOREIGN PATENT DOCUMENTS

| | | |
|---|---|---|
| DE | 10 2012 220 893 | 5/2014 |
| EP | 1243758 | 9/2002 |
| EP | 1574698 | 9/2005 |
| JP | 2010-077901 | 4/2010 |
| KR | 20150075975 | 7/2015 |
| WO | WO 2012/156175 | 11/2012 |
| WO | WO 2015/197087 | 12/2015 |

\* cited by examiner

APPARATUS AND METHOD FOR COMBINED ELECTRICAL AND MECHANICAL UTILIZATION OF THE ENERGY OF AN EXPANSION MACHINE

BACKGROUND OF THE INVENTION

1. Field of the Invention

The invention relates to an apparatus, preferably for a motor vehicle, in particular for a commercial vehicle, for example a lorry or an omnibus, that makes selective and therefore combined electrical utilization and mechanical utilization of the energy of an expansion machine of, for example, a mobile waste heat utilization system possible and to a corresponding operating method.

2. Description of the Related Art

In systems for waste heat utilization (Waste Heat Recovery=WHR) of internal combustion engines, steam circuits, inter alia, are used. Here, a circuit medium has to be brought to a high pressure level, evaporated in an evaporator, and superheated. The steam is fed to an expansion machine that converts the energy stored in the steam into utilizable energy. Downstream of the expansion machine, the steam is liquefied again and is fed to a feed pump.

It is known from practice to utilize the drive energy generated by the expansion machine in two ways, namely either electrically or mechanically.

Electrical Utilization:

Here, the expansion machine is coupled to a generator. The generator converts the mechanical energy of the expansion machine into electrical energy. The generated electrical energy is fed to the internal combustion engine again via an electric motor and therefore reduces the fuel consumption of the internal combustion engine.

The use of the electrical energy generated to maintain the on-board power network of a motor vehicle is therefore not expedient, since the provided performance (for example, 5 kW in a main operating range) lies above the required performance (for example, 2 kW). Rather, a plurality of previously mechanically driven components would have to be electrified, in order to increase the requirement for electrical energy in the motor vehicle (for example, power steering pump, coolant pump, various actuators). This results in the problem that the energy from the WHR system is not permanently available to its full extent. For example, the system requires some minutes to heat up after cold starting, until the expansion machine can be operated. At high temperatures, the energy that can be generated of the expansion machine of the WHR system is also reduced on account of limited performance of the vehicle cooling system. In these cases, the high electrical energy requirement of the motor vehicle would then have to be generated in a different way, which can require additional generators on the internal combustion engine.

However, electrical utilization of the expander energy permits an attachment of the expansion machine independent of the engine with regard to rotational speed and positioning. This leads to it not being absolutely necessary for the expansion machine to be installed on the internal combustion engine and to it being possible for the expansion machine to be operated in an optimum rotational speed range despite fluctuating internal combustion engine rotational speeds. This advantage can compensate for or even overcompensate for the disadvantage of the expander-generator-electric motor-internal combustion engine efficiency chain. A further advantage of the electrical utilization consists in it being possible for the electrical energy to be buffer-stored in combination with a battery. As a result, the WHR system can also generate energy when the internal combustion engine is, for example, in braking mode. The buffer-stored energy is then made available to the internal combustion engine again via the electric motor in a delayed manner.

Generators for electrical utilization of the expander energy will usually operate with operating voltages of greater than 24 V on account of the required power outputs. In principle, fast-rotating turbomachines (steam turbines) are more suitable for coupling to a generator than working chamber-forming machines (for example, piston engines) at lower rotational speeds, since fast-rotating generators are of more compact design.

Mechanical Utilization:

Here, the expansion machine is coupled mechanically to the internal combustion engine via a transmission. It is an object of the transmission to convert the rotational speed and to bridge spacings between the expansion machine and the internal combustion engine, and to connect and disconnect the expansion machine to/from the internal combustion engine. The transmission can consist of a drive in various embodiments (for example, friction wheel mechanism, spur gear mechanism, planetary gear mechanism, chain drive, and/or belt drive, etc.) or combinations thereof and an active or passive switching element for connecting and disconnecting the expansion machine and internal combustion engine (for example, clamping body freewheel, switchable freewheel, electrically or hydraulically actuated multiple disc clutch, etc.). The transmission feeds the mechanical energy of the expansion machine to the internal combustion engine again and therefore reduces the fuel consumption of the internal combustion engine.

One advantage of the mechanical coupling is that the expander energy does not always have to be permanently available. If the WHR system is active, the additional mechanical energy of the expansion machine leads to a reduction in the fuel consumption; if the system is not ready for operation, the internal combustion engine compensates for this missing energy.

However, a mechanical utilization concept of the expander energy results in an attachment of the expansion machine that is dependent on the engine with regard to rotational speed and positioning. This leads to it being absolutely necessary for the expansion machine to be installed on the internal combustion engine, in order for it to be possible to introduce the energy into the crankshaft of the internal combustion engine by way of paths which are as short as possible. In addition, a fluctuating engine rotational speed also leads to a fluctuating expander rotational speed, as a result of which the expansion machine cannot always be operated in an optimum rotational speed range. This disadvantage can be compensated for or even overcompensated for by way of the advantage of the short expander-transmission-internal combustion engine efficiency chain, since modern transmissions have very high degrees of efficiency. The disadvantage of the rotational speed fluctuations can also be reduced by way of the selection of those expander types which have a very flat characteristic curve in the efficiency/rotational speed characteristic diagram.

A further disadvantage of the mechanical utilization consists in that no energy can be buffer-stored. As a result, the WHR system cannot generate any energy when the internal combustion engine is, for example, in braking mode. The energy stored in the circuit on account of the thermal inertia has to be conducted past the expansion machine and therefore cannot be used in a fruitful manner.

In principle, working chamber-forming machines (for example, piston engines) at lower rotational speeds are more suitable for mechanical coupling via a transmission than fast-rotating turbomachines (steam turbines), since the transmission can be of simpler configuration.

SUMMARY OF THE INVENTION

It is an object of one aspect of the invention to combine the above-described advantages of the known utilization concepts and to overcome the disadvantages, in particular to provide an option, by which a waste heat utilization system can be utilized in a more effective manner.

The concept according to one aspect of the invention relates, in particular, to an apparatus and a method which, instead of pure electrical utilization or pure mechanical utilization, make combined utilization of the recuperated energy of an expansion machine of a waste heat utilization system possible.

The invention provides an apparatus, preferably for a motor vehicle, for example a commercial vehicle, in particular a lorry or an omnibus.

The apparatus comprises, in particular, an internal combustion engine (for example, petrol, diesel, or gas engine or an engine that can be driven using an alternative fuel), an expansion machine, and a generator. The expansion machine and/or the generator can expediently be installed directly or indirectly on the internal combustion engine.

The apparatus is distinguished, in particular, by the fact that the expansion machine and the generator can be operatively connected both to one another and in each case to the internal combustion engine, preferably a shaft (for example, crankshaft or power take-off shaft) or a power take-off of the internal combustion engine, via a transmission, with the result that selective and therefore combined electrical utilization and mechanical utilization of the energy of the expansion machine is made possible. Within the scope of the invention, the generator can preferably be operatively connected fixedly and/or non-switchably, in particular permanently, to the internal combustion engine via the transmission, with the result that, for example, the operative connection between the generator and the internal combustion engine cannot be disconnected and therefore expediently cannot be established and disconnected selectively. Within the scope of the invention, it is possible as an alternative or in addition, however, that the operative connection between the expansion machine and the internal combustion engine can be established and disconnected by the transmission.

The transmission can expediently be designed to selectively establish and to disconnect the operative connection of the expansion machine to the internal combustion engine, but in contrast to expediently ensure a fixed and/or non-switchable, in particular permanent, operative connection between the generator and the internal combustion engine.

The transmission can have a drive and a switching element. The drive of the transmission can be, for example, a single-stage or multiple-stage friction wheel or spur gear stage, expediently without or with at least one intermediate wheel/gear, for example integrated into a wheel/gear drive of the internal combustion engine or arranged separately with respect to the latter. The drive of the transmission can likewise be configured as an external flexible drive (for example, chain or belt drive) or can consist of a combination of different drives.

Expediently in a manner dependent on the type of expansion machine, the transmission can preferably have, in addition to the drive, at least one clutch or switching element, by way of which the connection between the expansion machine and the internal combustion engine can be disconnected, in order for it not to be necessary to be coupled to the expansion machine, for example, during cold starting.

The clutch or switching element of the transmission can expediently be active (for example, electrically or hydraulically actuated multiple disc clutch, switchable freewheel, etc.) or passive (for example, clamping body freewheel). The active embodiment preferably comprises an electrical or hydraulic actuator.

Expediently in a manner dependent on the type of expansion machine, the transmission can preferably have, in addition to the drive, at least one decoupling element, by way of which the transmission of torsional vibrations between (the expediently connected components) expansion machine-internal combustion engine-generator can be suppressed. The decoupling element of the transmission can be, for example, a torsionally elastic connection.

The generator can be configured, for example, as a low voltage generator (for example, 24 V or 48 V) or high voltage generator (for example, 400 V to 800 V).

The apparatus can comprise, in particular, an engine backpressure brake system (for example, exhaust flap brake, turbo exhaust flap brake, exhaust valve brake system, or turbo exhaust valve brake system).

It is possible that the expansion machine is part of a mobile waste heat utilization system for converting waste heat of the internal combustion engine and/or for converting waste heat of the engine backpressure brake system into utilizable energy, preferably by steam circuit, for example an ORC process (Organic Rankine Cycle). The waste heat utilization system, in particular the expansion machine, therefore serves, in particular, for energy recuperation from the waste heat of the internal combustion engine.

It is possible that the expansion machine and the generator can be operatively connected both to one another and in each case to a shaft of the internal combustion engine via the transmission. The shaft preferably comprises the crankshaft of the internal combustion engine.

It is possible that the generator is configured as a motor/generator, preferably in order to act selectively in an expediently current-generating manner as a generator or in an expediently current-consuming manner as a motor, in particular in order to selectively operate in a current-generating manner in a generator operating mode and in a current-consuming manner in a motor operating mode. As an alternative, it is possible that the generator is configured as a pure generator and therefore expediently has no motor function.

It is possible that the generator is connected to an expediently electrical and/or electronic system via an expediently electrical and/or electronic connection. The generator can be connected to the system, for example, via at least one electrical and/or electronic line. It is likewise possible that the system or at least parts thereof is/are installed directly on the generator.

The system can have, for example, at least one of the following: an energy store which can be charged by the generator for storing electrical energy, at least one electrical consumer of a motor vehicle (for example, power steering pump, coolant pump and/or one or more actuators), a, for example, DC/DC converter for supplying an on-board power network of a motor vehicle, an electric motor, via which energy from the energy store can be converted into mechanical energy and can be made available to the internal combustion engine, and/or a control device for controlling the generator.

The electrical and/or electronic system can be part of an electrical and/or electronic infrastructure of a hybrid drive system which is installed in the motor vehicle, for example can be connected to and/or combined with a hybrid drive system.

The energy store can have, for example, one or more low voltage or high voltage batteries, for example 24 V, 48 V or 400 V, to 800 V batteries.

As has been mentioned above, it is possible that the system has an electric motor, via which energy from the energy store can be made available to the internal combustion engine. In this case, the generator is expediently not configured as a motor/generator, but rather as a pure generator. The electric motor of the system is preferably a separate component relative to the generator, for example the electric motor of a hybrid drive system already installed in the vehicle.

The system, expediently its energy store, can serve, for example, to make electrical energy available for an on-board power network of a motor vehicle and/or at least one electrical consumer of a motor vehicle, for example via a DC/DC converter which can optionally be integrated into the system. Thus, in particular via the DC/DC converter, which is preferably integrated into the system, the electrical energy for the on-board power network and/or the at least one electrical consumer can also be made available at a low voltage level (for example, 24 V voltage level) in the case of relatively high operating voltages of the generator (for example, 48 V). As a result, the previous 24 V generator can expediently possibly be dispensed with and, for example, the components of expansion machine and generator can be installed in the installation space which becomes free in a manner which is virtually neutral in terms of installation space.

It is possible that the storage device (for example, 48 V batteries) replaces the large part of the storage capacity of the previous 24 V batteries, a residual capacity on a 24 V basis expediently remaining necessary merely for the starter of the motor vehicle.

The generator is preferably operatively connected to the internal combustion engine in a fixed and/or non-switchable manner, for example such that it cannot be disconnected and/or is permanent.

The transmission is preferably configured to selectively establish and to disconnect the operative connection of the expansion machine to the internal combustion engine. As an alternative or in addition, the transmission can form a fixed and/or non-switchable operative connection (for example, such that it cannot be disconnected and/or is permanent) between the generator and the internal combustion engine.

Within the scope of one aspect of the invention, there is therefore preferably an expediently switchable operative connection between the expansion machine and the internal combustion engine, and in contrast there is an expediently fixed and/or non-switchable operative connection (for example, such that it cannot be disconnected and/or is permanent) between the generator and the internal combustion engine.

The apparatus can be operated in different operating modes, namely in particular in an expander mode, a generator mode, and/or a motor mode.

It is possible that, in an expander mode, the waste heat utilization system converts waste heat of the internal combustion engine into utilizable energy and the expansion machine generates mechanical energy therefrom and makes the mechanical energy available to the internal combustion engine via the transmission and/or, during this, the generator expediently acts as a generator and generates electrical energy from the utilizable energy, preferably for the system.

It is possible that the internal combustion engine generates drive energy in the expander mode.

Energy recuperated by way of the waste heat utilization system can therefore expediently be divided to the internal combustion engine in the form of mechanical utilization on one side and to the system in the form of electrical utilization on the other side.

In the generator mode, the waste heat utilization system may not yet be ready for operation and/or be in a warm-up phase (for example, cold starting), in which the expansion machine does not yet generate any mechanical energy. It is possible as an alternative or in addition that, in the generator mode, the internal combustion engine is in an overrun and/or braking mode and the expansion machine still generates utilizable energy on account of the thermal inertia of the waste heat utilization system despite the lacking thermal input from the internal combustion engine. The utilizable energy can be made available to the generator for conversion into electrical energy and forwarding to the system. As an alternative or in addition, mechanical energy can be made available to the generator by the internal combustion engine via the transmission to convert the said mechanical energy into electrical energy and to forward it to the system.

It is possible that, in a motor mode, the generator acts as a motor or the electric motor of the system acts as a motor.

It is possible that, in a motor mode, the expansion machine again generates mechanical energy or at least begins to do this, and makes the mechanical energy available to the internal combustion engine via the transmission. As an alternative or in addition, it is possible in the motor mode that the generator acts as a motor or the electric motor of the system acts as a motor and converts electrical energy which comes from the energy store into mechanical energy and makes it available to the internal combustion engine via the transmission.

In particular, in the motor mode, the expansion machine can either generate no energy, can generate mechanical energy or can at least begin to generate mechanical energy and make it available to the internal combustion engine via the transmission.

It is possible that, in a generator mode, the generator acts as a generator and the expansion machine generates utilizable energy by the thermal input from the engine backpressure brake system, but preferably without the thermal input from the internal engine combustion of the internal combustion engine, and the utilizable energy is stored in the energy store and is made available to the internal combustion engine, for example, in a subsequent motor mode. It is to be mentioned that the thermal input from the engine backpressure brake system expediently takes place indirectly via the waste heat utilization system into the expansion machine.

As a result, it is possible, in particular, that the thermal input from the internal combustion engine can come either from the internal engine combustion or the engine backpressure brake system.

The generator or the electric motor of the system can preferably act as a motor in the motor mode until the energy store is at least largely emptied (for example, apart from the minimum permitted charging state of the battery) and the generator transfers into a generator mode again.

The internal combustion engine can be configured as a diesel engine, petrol engine, or gas engine, for example for stationary or mobile (for example, on-road, off-road or marine) applications. The internal combustion engine can likewise be capable of operation using alternative fuels.

It is to be mentioned that the expansion machine and/or the generator can be installed directly or indirectly on the internal combustion engine.

Moreover, it is to be mentioned that the energy flow from the generator and/or the expansion machine to the internal combustion engine or vice versa preferably takes place via the transmission.

The invention is not restricted to an apparatus, but rather also comprises an operating method for an apparatus which is preferably as described herein.

The invention relates, in particular, to an operating method for and/or configured by way of an apparatus having an internal combustion engine, an expansion machine and a generator, it being possible for the expansion machine and the generator to be operatively connected both to one another and in each case to the internal combustion engine via a transmission, and it being possible for selective and therefore combined electrical utilization and mechanical utilization of the energy of the expansion machine to take place. Within the scope of the invention, the generator can preferably be operatively connected to the internal combustion engine via the transmission in a fixed and/or non-switchable, in particular permanent, manner, with the result that, for example, the operative connection between the generator and the internal combustion engine cannot be disconnected and therefore expediently cannot be selectively established and disconnected. Within the scope one aspect of of the invention, it is possible as an alternative or in addition, however, that the operative connection between the expansion machine and the internal combustion engine can be established and disconnected by means of the transmission.

Further method steps result from the disclosure in respect of the apparatus, to which reference is made in order to avoid repetitions.

The disclosure and description made herein in respect of the apparatus also applies analogously to the operating method and can likewise expediently be claimed to this extent.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The above-described embodiments and features of the invention can be combined with one another. Other advantageous developments of the invention are disclosed in the subclaims or result from the following description of preferred embodiments of the invention in conjunction with the appended figures, in which:

DETAILED DESCRIPTION OF THE PRESENTLY PREFERRED EMBODIMENTS

The concept according to the invention relates to an apparatus and a method which, instead of pure electrical or pure mechanical utilization, make a combined utilization variant of the recuperated expander energy possible.

Figure 1:
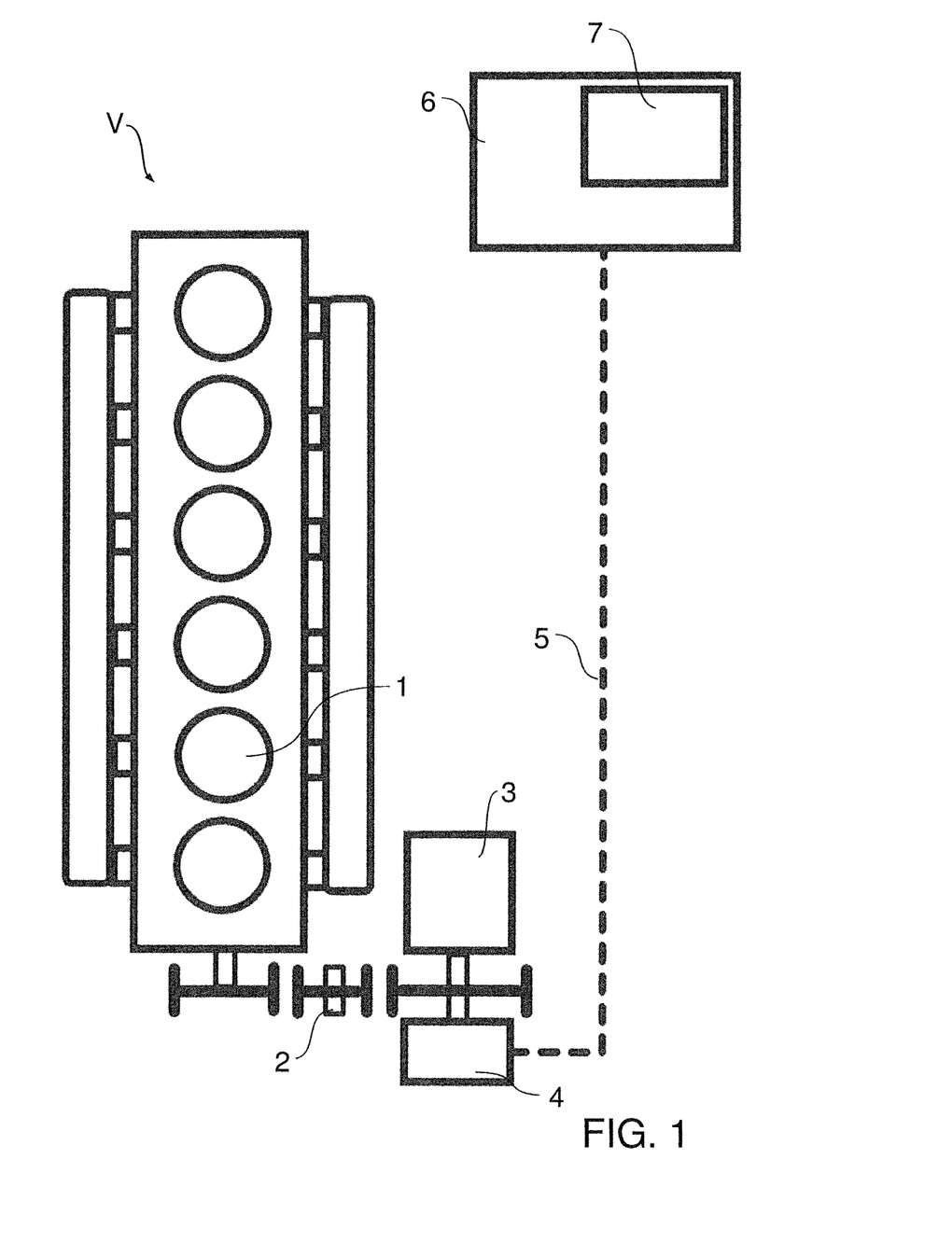
FIG. 1 is an apparatus according to one embodiment of the invention.

An apparatus V for combined or selective electrical and mechanical utilization of the energy of an expansion machine 3 is shown in FIG. 1 and is suitable, in particular, for installation in a motor vehicle, expediently commercial vehicle, for example lorry or omnibus.

The apparatus V comprises an internal combustion engine 1 which can preferably be a diesel, petrol, or gas engine for stationary or mobile (on-road, off-road, or marine) applications, or an engine using alternative fuels for the said areas of application. The expansion machine 3 and a motor/generator 4 are installed directly or indirectly on the internal combustion engine 1.

The expansion machine 3 is part of a waste heat utilization system that converts waste heat of the internal combustion engine 1 into utilizable energy again with the aid of a steam circuit, preferably an ORC process.

The motor/generator 4 can be configured as a low voltage (for example, 24 V, 48 V) or high voltage generator (for example, 400 V to 800 V) and, depending on requirements, can operate in a current-generating manner in the "Generator" operating mode or in a current-consuming manner in the "Motor" operating mode.

The expansion machine 3 and the generator 4 are operatively connected both to one another and in each case, in particular, to the crankshaft of the internal combustion engine 1 via a transmission 2.

The generator 4 is operatively connected to the internal combustion engine 1 in a fixed/non-switchable manner, with the result that there is expediently a permanent operative connection.

In contrast, the expansion machine 3 is operatively connected to the internal combustion engine 1 such that it can be switched, in particular disconnected, with the result that an operative connection can expediently be established and disconnected, in particular by the transmission 2.

The transmission 2 can consist of a drive and a switching element. The drive of the transmission 2 can be, for example, a single-stage or multiple-stage friction wheel or spur gear stage, expediently without or with at least one intermediate wheel/gear, for example integrated into a wheel/gear drive of the internal combustion engine 1 or arranged separately from the latter. The drive of the transmission 2 can likewise be configured as an external flexible drive (for example, chain or belt drive) or can consist of a combination of different drives.

In a manner dependent on the type of expansion machine 3, the transmission 2 can have, in addition to the drive, at least one clutch or switching element, by way of which the connection between the expansion machine 3 and the internal combustion engine 1 can be disconnected, in order for it not to be necessary to be coupled to the expansion machine 3, for example, during cold starting. The clutch or switching element of the transmission 2 can expediently be active (for example, electrically or hydraulically actuated multiple disc clutch, switchable freewheel, etc.) or passive (for example, clamping body freewheel).

In a manner dependent on the type of expansion machine 3, the transmission 2 can have, in addition to the drive, at least one decoupling element, by way of which the transmission of torsional vibrations between the connected components expansion machine 3-internal combustion engine 1-generator 4 can be suppressed. The decoupling element of the transmission 2 can be, for example, a torsionally elastic connection.

The motor/generator 4 is connected via an electrical/electronic connection 5 (for example, line/lines, interface/interfaces, etc.) to an expediently electrical/electronic system 6 that primarily has the object of storing electrical energy by an energy store 7 and controlling the operating mode of the motor/generator 4 by a control unit. Furthermore, the system 6 can comprise a motor vehicle on-board power network and/or at least one electrical consumer of the motor vehicle and/or be an electrical and/or electronic infrastructure of a hybrid drive system which is installed in the motor vehicle or can be combined with a hybrid drive system.

At relatively high operating voltages of the generator 4 (for example, 48 V), the electrical energy for the on-board power network and the electrical consumers can also be made available at the 24 V voltage level via a DC/DC converter which is preferably integrated into the electrical system 6. As a result, the previous 24 V generator can possibly be dispensed with and the components of expander 3 and motor/generator 4 can be installed into the free installation space in a manner virtually neutral in terms of installation space. In addition, the storage device 7 (for example, 48 V batteries) of the electrical system 6 can replace the large part of the storage capacity of the previous 24 V batteries; a residual capacity on a 24 V basis can remain necessary merely for the starter of the motor vehicle.

As mentioned above, the electrical system 6 can be part of an electrical and/or electronic infrastructure of a hybrid drive system which is installed in the motor vehicle, for example can be replaced by the latter and/or combined with the latter. In this case, the motor/generator 4 can be configured as a pure generator, the conversion and introduction of electrical energy preferably stored in the energy store 7 then taking place via the electric motor of the hybrid drive system which is already installed in the motor vehicle.

The apparatus V is configured to be operated in an expander mode, a generator mode, and a motor mode which can preferably be controlled via a control unit of the electrical system 6.

The method for combined electrical and mechanical utilization of the expander energy comprises a plurality of possible operating states which are controlled via the control unit of the electrical system 6.

Figure 2:
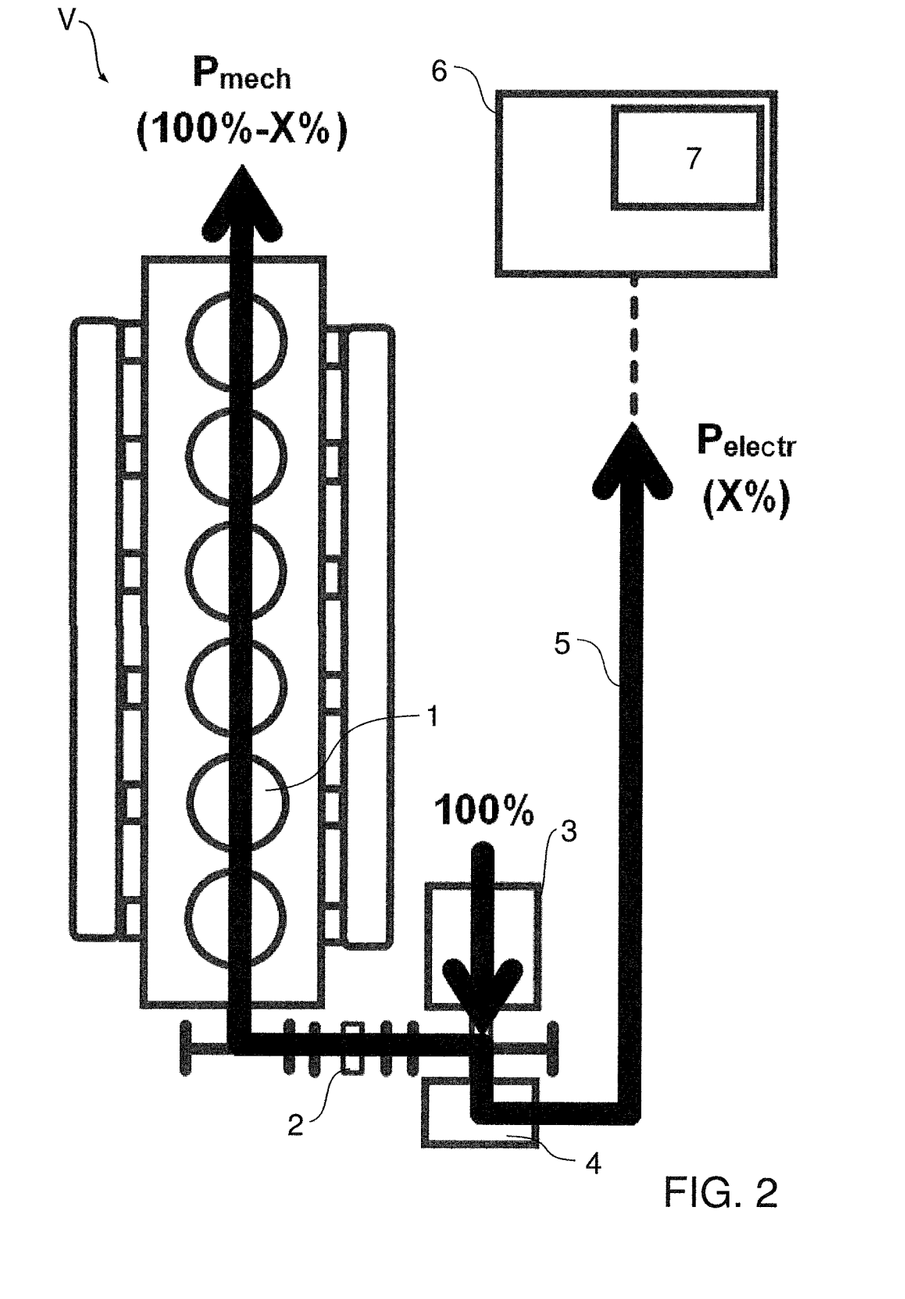
FIG. 2 is the apparatus from FIG. 1 in an expander mode.

FIG. 2 shows the apparatus V in an expander mode.

The "Expander mode" operating state occurs in that state, in which the internal combustion engine 1 generates drive energy and the waste heat utilization system is in operation for waste heat utilization.

In this operating state, the expansion machine 3 generates mechanical energy and makes it available to the internal combustion engine 1 via the transmission 2. During this, the motor/generator 4 operates in the generator mode and generates the required electrical energy for the system 6, for example the on-board power network and electrical actuators and/or consumers in the motor vehicle.

The energy flow in the expander mode is designed substantially as follows, as depicted in FIG. 2:

Of the 100% energy which is generated by the expansion machine 3, X % is converted into electrical energy via the motor/generator 4 in the generator mode and is made available to the electrical system 6. The remaining (100-X) % is available as mechanical energy at the crankshaft of the internal combustion engine 1 or for the internal combustion engine 1. The size of the value X is based on the current power consumption of the motor vehicle.

Advantages over purely electrical or purely mechanical utilization:

Despite electrical utilization, the electrical energy generated is independent of the currently generated expander energy, since the excess flows as mechanical energy to the internal combustion engine 1 in a manner which is optimum in terms of the degree of efficiency.

Figure 3:
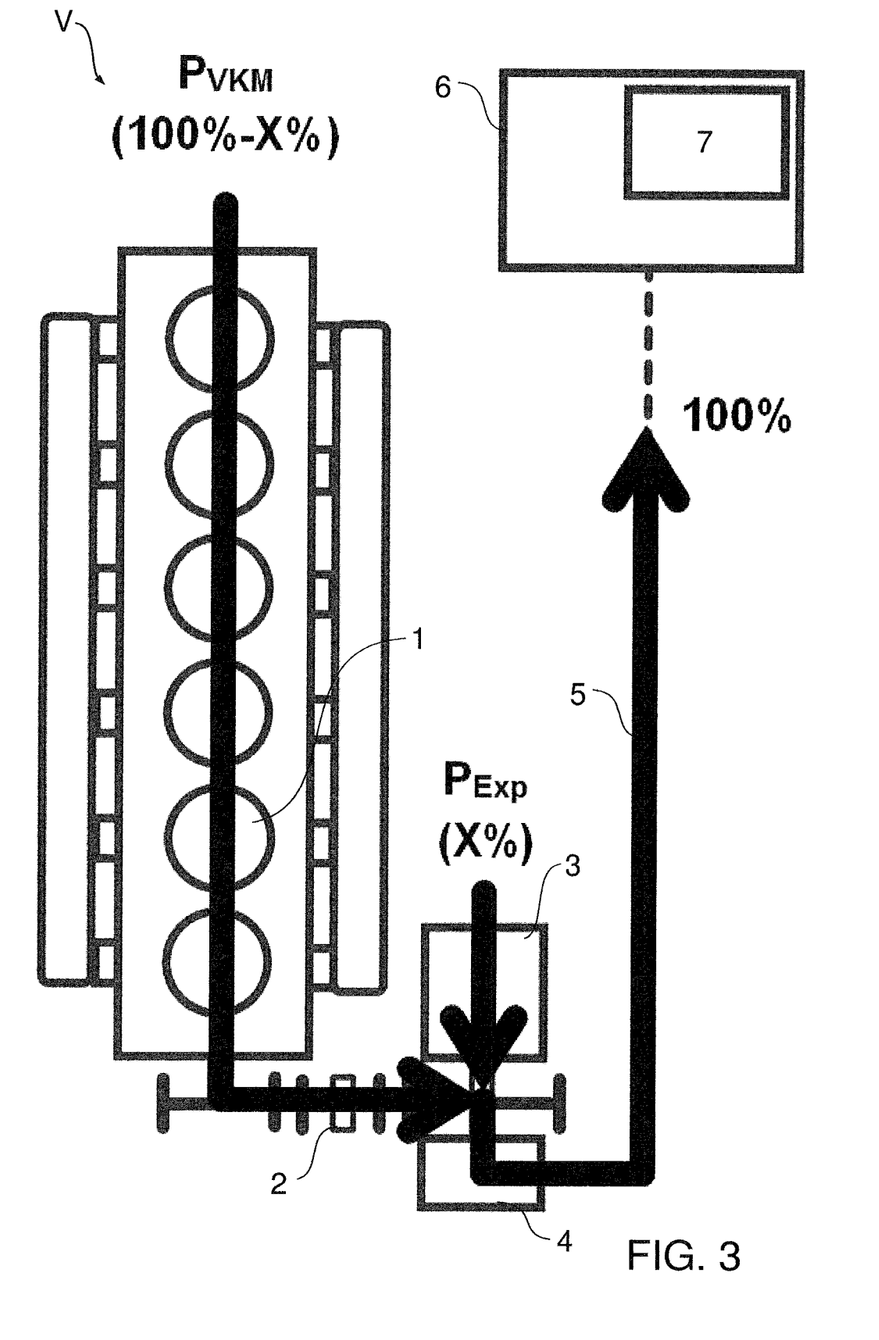
FIG. 3 is the apparatus from FIG. 1 in a generator mode.

FIG. 3 shows the apparatus V in a generator mode.

The "Generator mode" operating state occurs in that state, in which the waste heat utilization system is not yet ready for operation and is in the warm-up phase (for example, after cold starting) or in which the internal combustion engine 1 is in an overrun and/or braking mode.

In the warm-up phase of the waste heat utilization system, the expansion machine 3 does not yet generate any mechanical energy. During this, the motor/generator 4 operates in the generator mode and generates the necessary electrical energy for the system 6, for example the on-board power network and the electrical actuators and/or consumers in the motor vehicle.

In the overrun and/or braking mode of the internal combustion engine 1, the expansion machine 3 still generates utilizable energy, on account of the thermal inertia of the waste heat utilization system, despite the missing thermal input. During this, the motor/generator 4 operates in the generator mode and generates the maximum possible electrical energy made available to the energy store 7 of the system 6.

In the generator mode, it is possible, in particular, that the expansion machine 3 generates utilizable energy, to be precise by heat from an engine backpressure brake system, the heat from the engine backpressure brake system passing indirectly to the expansion machine 3 via the waste heat utilization system. The utilizable energy generated can be stored in the energy store 7 and can be made available to the internal combustion engine 1 in a subsequent motor mode.

The energy flow in the generator mode is designed substantially as follows, as depicted in FIG. 3:

Of the 100% energy generated by the motor/generator 4 in the generator mode, X % comes from the expansion machine 3, and the remaining (100-X) % is made available by the internal combustion engine 1 via the transmission 2 which is optimum in terms of the degree of efficiency. The size of the value X is zero during the warm-up operation of the waste heat utilization system.

Advantages over purely electrical or purely mechanical utilization:

In the overrun or braking mode of the internal combustion engine 1, the energy which is stored in the waste heat utilization system on account of the thermal inertia does not have to bypass the expansion machine 3 without being utilized, but rather can be converted into electrical energy and stored in a fruitful manner.

In addition, in the overrun and braking mode of the internal combustion engine 1, energy can preferably be recuperated by way of the motor/generator 4 and can be charged into the energy store 7 of the system 6.

Internal combustion engines 1 in the described applications are often equipped with modern engine braking systems which generate high, hot gas mass flows through the internal combustion engine 1 in the engine braking mode. In the case of purely electrical or purely mechanical utilization of the expander energy of the waste heat utilization system, this is lost to the surroundings via the exhaust gas system, since the generated expander energy cannot be exploited in this operating state. In the case of combined utilization according to the invention, the said heat can be utilized and can be buffer-stored via the motor/generator 4 and the system 6 and utilized again in the following drive phase.

Figure 4:
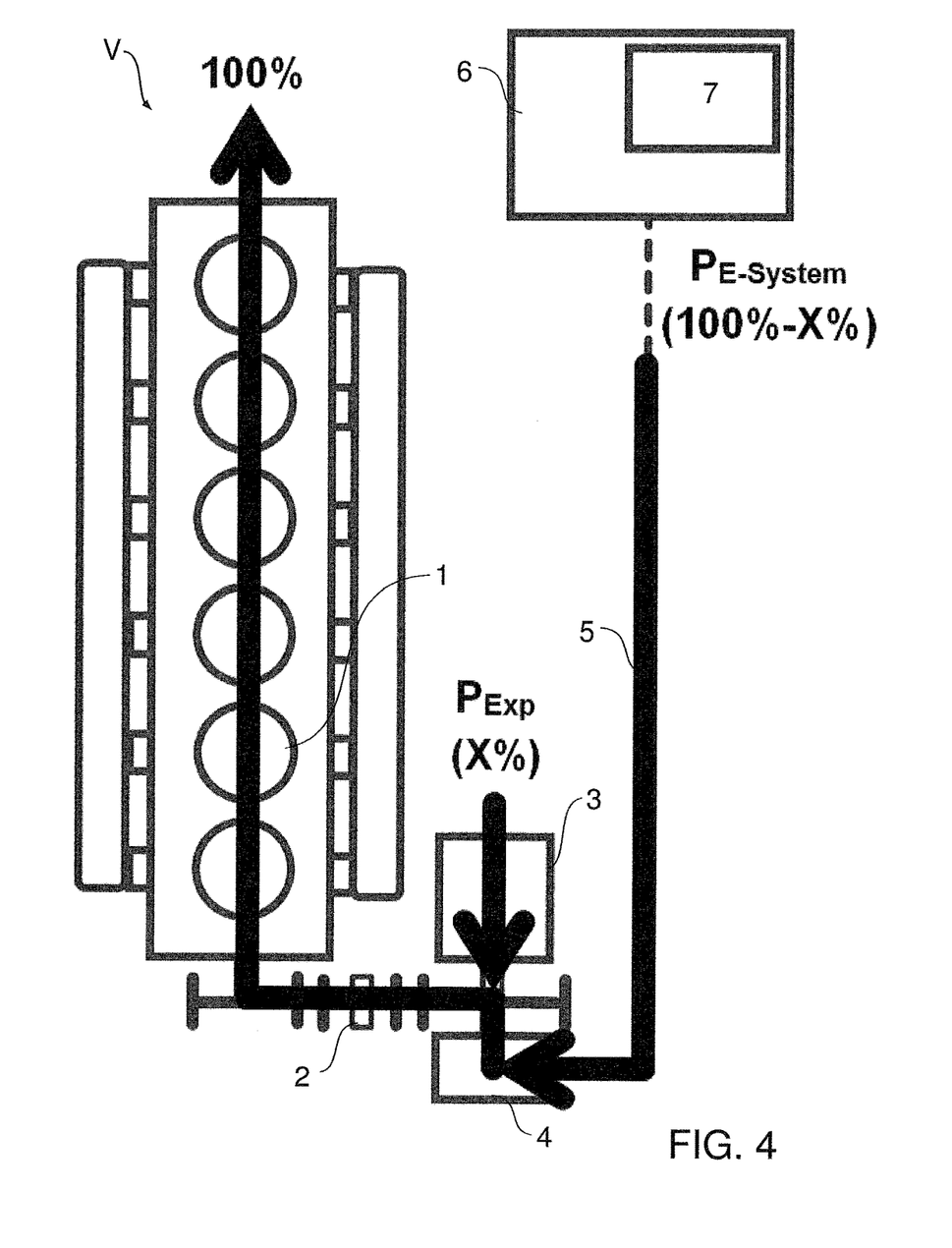
FIG. 4 is the apparatus from FIG. 1 in a motor mode.

FIG. 4 shows the apparatus V in a motor mode.

The "Motor mode" operating state occurs in that state, in which the waste heat utilization system is in operation or out of operation and the energy store 7 of the electrical system 6 has been charged completely or else only partially with the aid of the motor/generator 4 in a preceding overrun and/or braking mode of the internal combustion engine 1.

In this operating state, the expansion machine 3 either does not generate any mechanical energy, it generates mechanical energy or it begins to generate mechanical energy again by way of the thermal input into the waste heat utilization system which is again present, and makes the said mechanical energy available to the internal combustion engine 1 via the transmission 2.

During this, the motor/generator 4 operates in the motor mode and also introduces the electrical energy which is removed from the energy store 7 of the system 6 and is converted into mechanical energy into the internal combustion engine 1 via the transmission 2.

The on-board power network and the electrical actuators and/or consumers in the motor vehicle can be supplied by the energy store 7 of the system 6, for example via a DC/DC converter, until the said energy store 7 is emptied and the motor/generator 4 transfers into the generator mode again.

The energy flow is designed substantially as follows, as depicted in FIG. 4:

Of the 100% energy which is made available to the internal combustion engine 1 via the transmission 2, X % comes from the expansion machine 3 and the remaining (100−X) % comes from the motor/generator 4 which uses the energy in the energy store 7 of the system 6. If insufficient energy from the waste heat utilization system is available to the expansion machine 3, the size of the value X is zero.

Advantages over purely electrical or purely mechanical utilization:

In the fired mode of the internal combustion engine 1, which follows an overrun and/or braking phase of the internal combustion engine 1, no energy from the expander 3 is directly available, since the waste heat utilization system first of all has to warm up again. Precisely in these fuel-intensive operating states, the energy recuperated and stored in the overrun and/or braking mode of the internal combustion engine 1 can be made available directly to the internal combustion engine 1 via the motor/generator 4 in a manner that reduces the consumption.

It is to be mentioned that the generator 4 does not have to be configured as a motor/generator, but rather can also be configured as a pure generator. In this case, the system 6 can have an electric motor which can assume the motor function of the motor/generator 4.

The system 6 and the electric motor can be part here of a hybrid drive system which is already installed in the motor vehicle.

The invention is not restricted to the above-described preferred embodiments. Rather, a multiplicity of variants and modifications are possible which likewise use the concept of the invention and therefore fall within the scope of protection. Moreover, the invention also claims protection for the subject matter and the features of the subclaims independently of the features and claims referred to.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. An apparatus, comprising:
   an internal combustion engine;
   an expansion machine;
   a generator,
   a transmission configured to operatively connect the expansion machine and the generator to one another and to the internal combustion engine via a transmission to make selective electrical utilization and mechanical utilization of energy of the expansion machine,
   wherein the generator is connected to a system, the system comprising:
      an energy store that can be charged by the generator for storing electrical energy;
      at least one electrical consumer of a motor vehicle;
      a DC/DC converter configured to supply the on-board power network of the motor vehicle, and
      a control device configured to controlling the generator.

2. The apparatus according to claim 1, wherein the expansion machine is part of a waste heat utilization system that converts waste heat of the internal combustion engine into utilizable energy by a steam circuit.

3. The apparatus according to claim 1, wherein the expansion machine is part of a waste heat utilization system that converts waste heat of an engine backpressure sure brake system into utilizable energy by a steam circuit.

4. The apparatus according to claim 1, wherein the expansion machine and the generator are configured to be operatively connected both to one another and in each case to a one of:
   a crankshaft of the internal combustion engine and
   a power take-off of the internal combustion engine via the transmission.

5. The apparatus according to claim 1, wherein the generator is configured as one of:
   a) a motor/generator to operate selectively as a generator or as a motor, and
   b) a pure generator.

6. The apparatus according to claim 1, wherein the system has at least one of the following:
   a converter configured to supply an on-board power network of the motor vehicle, and
   an electric motor, via which energy from the energy store is converted into mechanical energy and is made available to the internal combustion engine.

7. The apparatus according to claim 6, wherein the energy store provides electrical energy for at least one of the on-board power network and the at least one electrical consumer.

8. The apparatus according to claim 6, wherein the system is part of at least one of an electrical and an electronic infrastructure of a hybrid drive system that can be installed in the motor vehicle.

9. The apparatus according to claim 1, wherein the generator is operatively connected to the internal combustion engine in at least one of a fixed manner and non-switchable manner.

10. The apparatus according to claim 1, wherein the transmission is configured to at least one of:
  selectively establish and disconnect the operative connection between the expansion machine and the internal combustion engine,
  ensure a fixed operative connection between the generator and the internal combustion engine, and
  ensure a non-switchable operative connection between the generator and the internal combustion engine.

11. The apparatus according to claim 6, wherein the apparatus is configured to operate selectively in at least one of an expander mode, a motor mode, and a generator mode.

12. The apparatus according to claim 11, wherein, in the expander mode,
  a waste heat utilization system converts waste heat of the internal combustion engine into utilizable energy,
  the expansion machine generates mechanical energy from the utilizable energy, the mechanical energy being made available to the internal combustion engine via the transmission, and
  the generator generating electrical energy from the utilizable energy, the electrical energy being made available to the system.

13. The apparatus according to claim 11, wherein, in the generator mode,
  the generator acts as a generator and the expansion machine generates utilizable energy due to thermal inertia of a waste heat utilization system despite lacking or low thermal input from the internal combustion engine, and
  the generator generates electrical energy from the utilizable energy of the expansion machine and from mechanical energy of the internal combustion engine, the electrical energy being made available to the system.

14. The apparatus according to claim 11, wherein, in the motor mode,
  one of the generator acts as a motor and an electric motor of the system acts as a motor, to convert electrical energy that comes from an energy store into mechanical energy and makes the mechanical energy available to the internal combustion engine via the transmission.

15. The apparatus according to claim 11, wherein, during the motor mode, the expansion machine at least one of
  does not generate any mechanical energy, generates the mechanical energy, and
  at least begins to generate the mechanical energy, and makes the mechanical energy available to the internal combustion engine via the transmission.

16. The apparatus according to claim 11, wherein, in the motor mode, one of the generator acts as a motor and an electric motor of the system acts as a motor, until an energy store is at least largely emptied and the generator transfers into a generator mode.

17. The apparatus according to claim 11, wherein, in a generator mode, the generator acts as a generator, and the expansion machine generates utilizable energy by thermal input from an engine backpressure brake system, without thermal input from internal engine combustion of the internal combustion engine, and the utilizable energy is stored in an energy store and is made available to the internal combustion engine in a subsequent motor mode.

18. An operating method for an apparatus, having an internal combustion engine, an expansion machine, a generator, a system to which the generator is connected, and a transmission, comprising:
  charging an energy store of the system by the generator for storing electrical energy;
  supplying by a DC/DC converter an on-board power network of the motor vehicle,
  controlling the generator by a control device; and one of:
  operatively connecting the expansion machine and the generator to one another and the internal combustion engine via the transmission, and
  operatively connecting at least one of the expansion machine and the generator to the internal combustion engine via the transmission, and
  selective utilization of electrical and mechanical energy of the expansion machine.

19. A motor vehicle comprising:
  an apparatus comprising:
    an internal combustion engine;
    an expansion machine;
    a generator,
    a transmission configured to operatively connect the expansion machine and the generator to one another and to the internal combustion engine via a transmission to make selective electrical utilization and mechanical utilization of energy of the expansion machine,
  wherein the generator is connected to a system, the system comprising:
    an energy store that can be charged by the generator for storing electrical energy;
    at least one electrical consumer of a motor vehicle;
    a DC/DC converter configured to supply the on-board power network of the motor vehicle, and
    a control device configured to controlling the generator.

* * * * *